(12) United States Patent  (10) Patent No.: US 8,516,917 B2
Zhao  (45) Date of Patent: Aug. 27, 2013

(54) TRANSLATIONAL BRANCH JOINT AND PARALLEL ROBOT UTILIZING THE SAME

(75) Inventor: Zhi-Ming Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 702 days.

(21) Appl. No.: 12/650,822

(22) Filed: Dec. 31, 2009

(65) Prior Publication Data

US 2011/0113918 A1    May 19, 2011

(30) Foreign Application Priority Data

Nov. 18, 2009   (CN) .......................... 2009 1 0309950

(51) Int. Cl.
*B25J 17/00* (2006.01)
*B25J 17/02* (2006.01)
*B25J 18/00* (2006.01)

(52) U.S. Cl.
USPC ........................................ 74/490.01; 901/15

(58) Field of Classification Search
USPC .............. 74/490.01, 490.03, 490.05; 901/15, 901/23, 28, 27, 19
See application file for complete search history.

(56) References Cited

U.S. PATENT DOCUMENTS

| 5,845,540 A | * | 12/1998 | Rosheim | 74/490.05 |
| 8,113,083 B2 | * | 2/2012 | Breu | 74/490.01 |
| 2010/0005919 A1 | * | 1/2010 | Breu | 74/490.05 |

FOREIGN PATENT DOCUMENTS

| EP | 1878544 A1 | 1/2008 |
| JP | 7-148678 A | 6/1995 |
| WO | WO2008092540 A1 | 8/2008 |

* cited by examiner

*Primary Examiner* — Justin Krause
*Assistant Examiner* — Gregory Prather
(74) *Attorney, Agent, or Firm* — Altis Law Group, Inc.

(57) ABSTRACT

An exemplary translational branch joint for a parallel robot includes a swing arm connected to a four-bar linkage. The four-bar linkage includes two parallel connecting bars, a first link member, a second link member, and joint members. The first link member and the second link member connect the connecting bars. Each joint member comprises a first joint portion and a second joint portion extending from the first joint portion. The first joint portion has a first axis, and the second joint portion has a second axis substantially perpendicular to the first axis. The first joint portions of the joint members are rotatably connected to ends of the first link member and the second link member, and the second joint portions of the joint members are rotatably connected to ends of the connecting bars.

18 Claims, 4 Drawing Sheets

TRANSLATIONAL BRANCH JOINT AND PARALLEL ROBOT UTILIZING THE SAME

BACKGROUND

1. Technical Field

The present disclosure relates generally to robotics and, more particularly, to a translational branch joint used in a parallel robot.

2. Description of Related Art

Parallel robots are widely used in modern industry because they provide advantageous precision and performance Referring to FIG. 4, a commonly used parallel robot 100 includes a support 11, a moving platform 12, and a pivot shaft 13 and three translational branch joints 15 connecting the support 11 with the moving platform 12. Each translational branch joint 15 includes a swing arm 151 and a four-bar linkage 152. The swing arm 151 is rotatably connected to the support 11. Four connecting bars of the four-bar linkage 152 are rotatably connected to each other via ball joints 153. Opposite ends of the four-bar linkage 152 are respectively fixed to the swing arm 151 and the moving platform 12. In use, the swing arm 151 is rotated by an electrical motor, such that the four-bar linkage 152 alters its parallelogram configuration in order to move the moving platform 12.

However, the ball joints 153 connecting the bars of the four-bar linkage 152 generally provide rotation angles of 25° or less. Thus the translational distance of the four-bar linkage 152 is limited, with the moving distance of the moving platform 12 restricted correspondingly. In addition, the ball joints 153 are difficult to machine and assemble, increasing the complexity and cost of manufacture.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
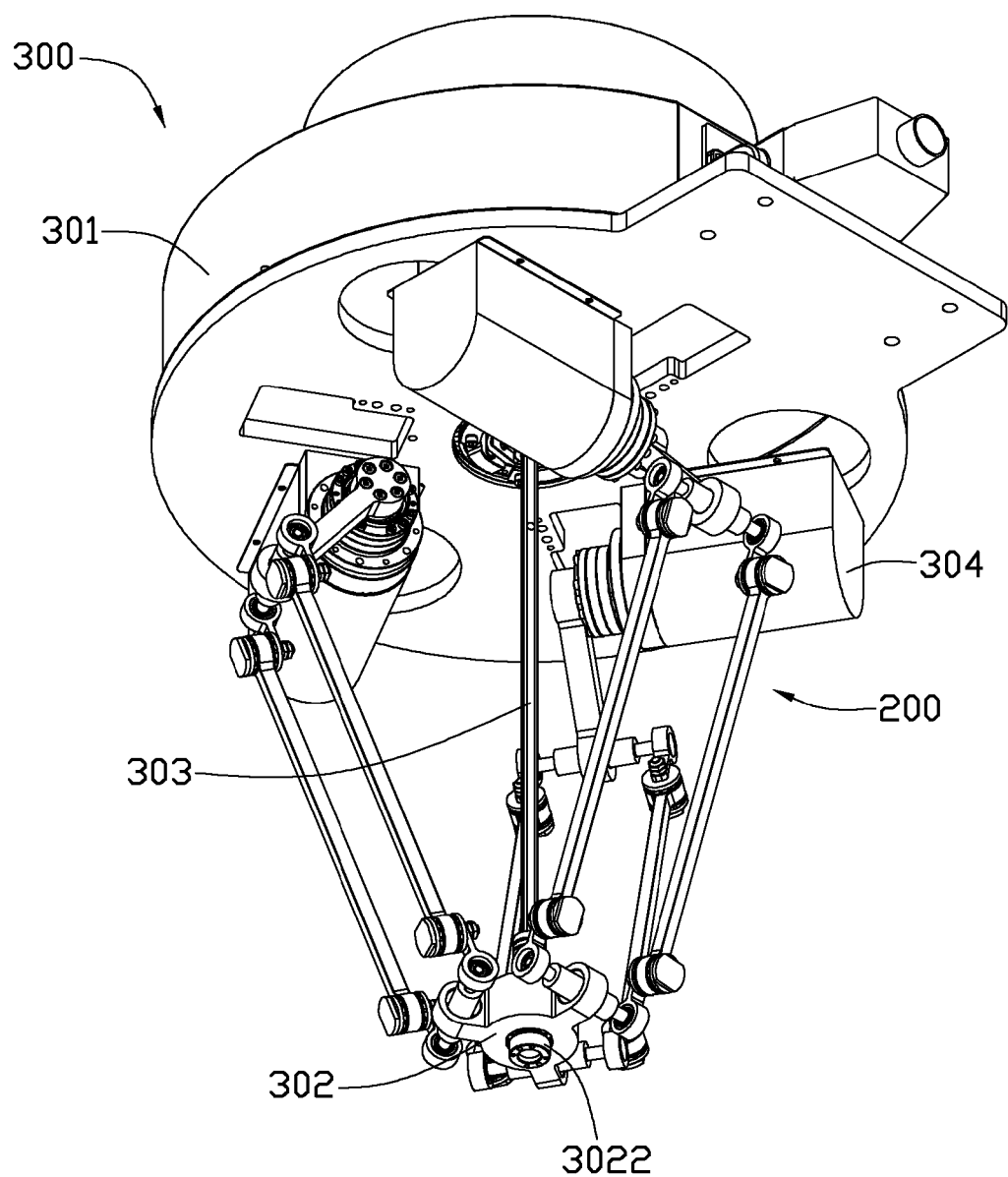
FIG. 1 is an isometric view of an embodiment of a parallel robot with three translational branch joints.

Referring to FIG. 1, an embodiment of a parallel robot 300 includes a support 301, a moving platform 302, a rotatable shaft 303, and three translational branch joints 200. The rotatable shaft 303 and the translational branch joints 200 connect the support 301 to the moving platform 302. Three driving devices 304 are positioned at a bottom of the support 301, for moving the translational branch joints 200.

Figure 2:
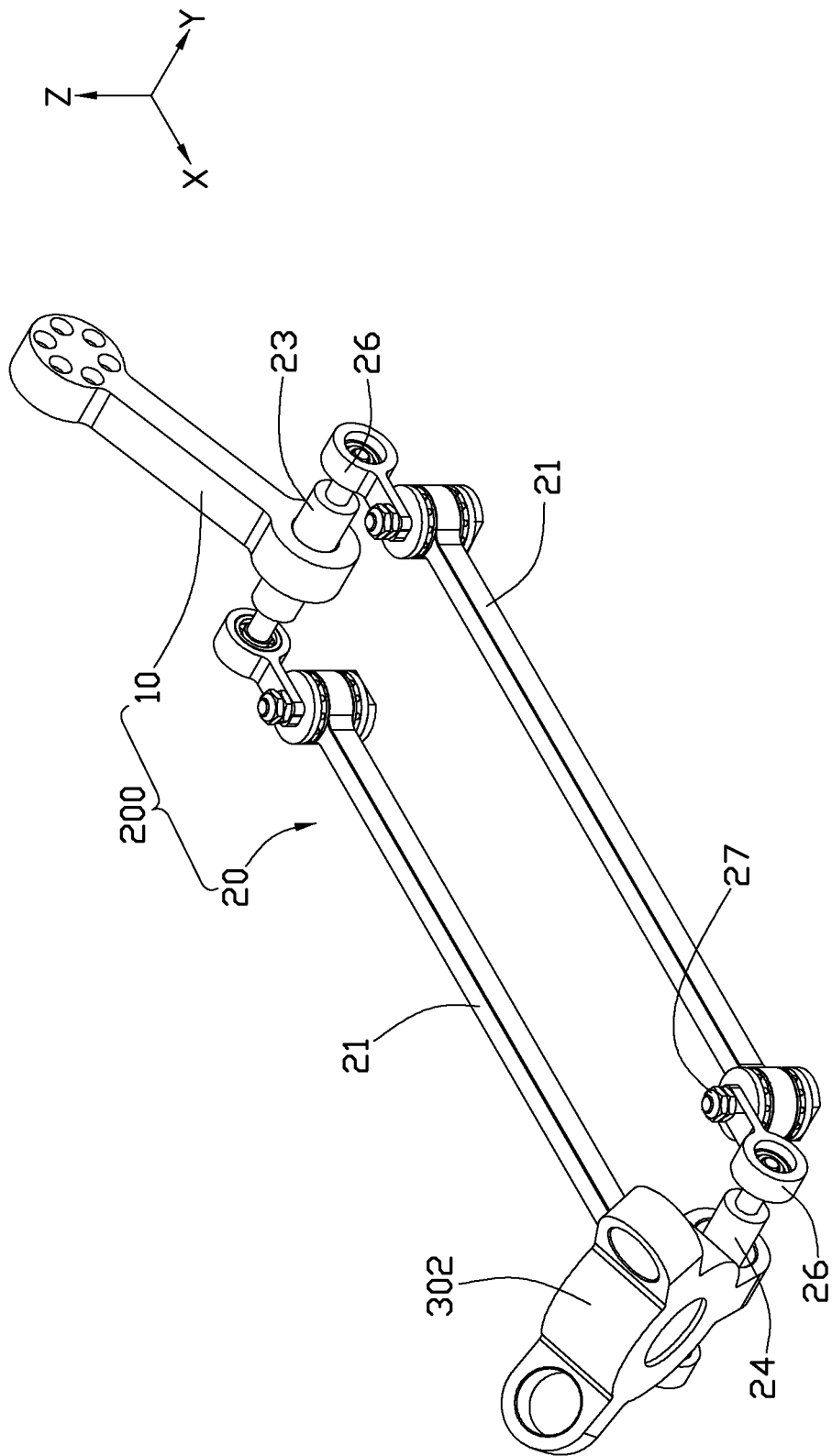
FIG. 2 is an isometric view of a translational branch joint used in a parallel robot such as, for example, that of FIG. 1.
Figure 3:
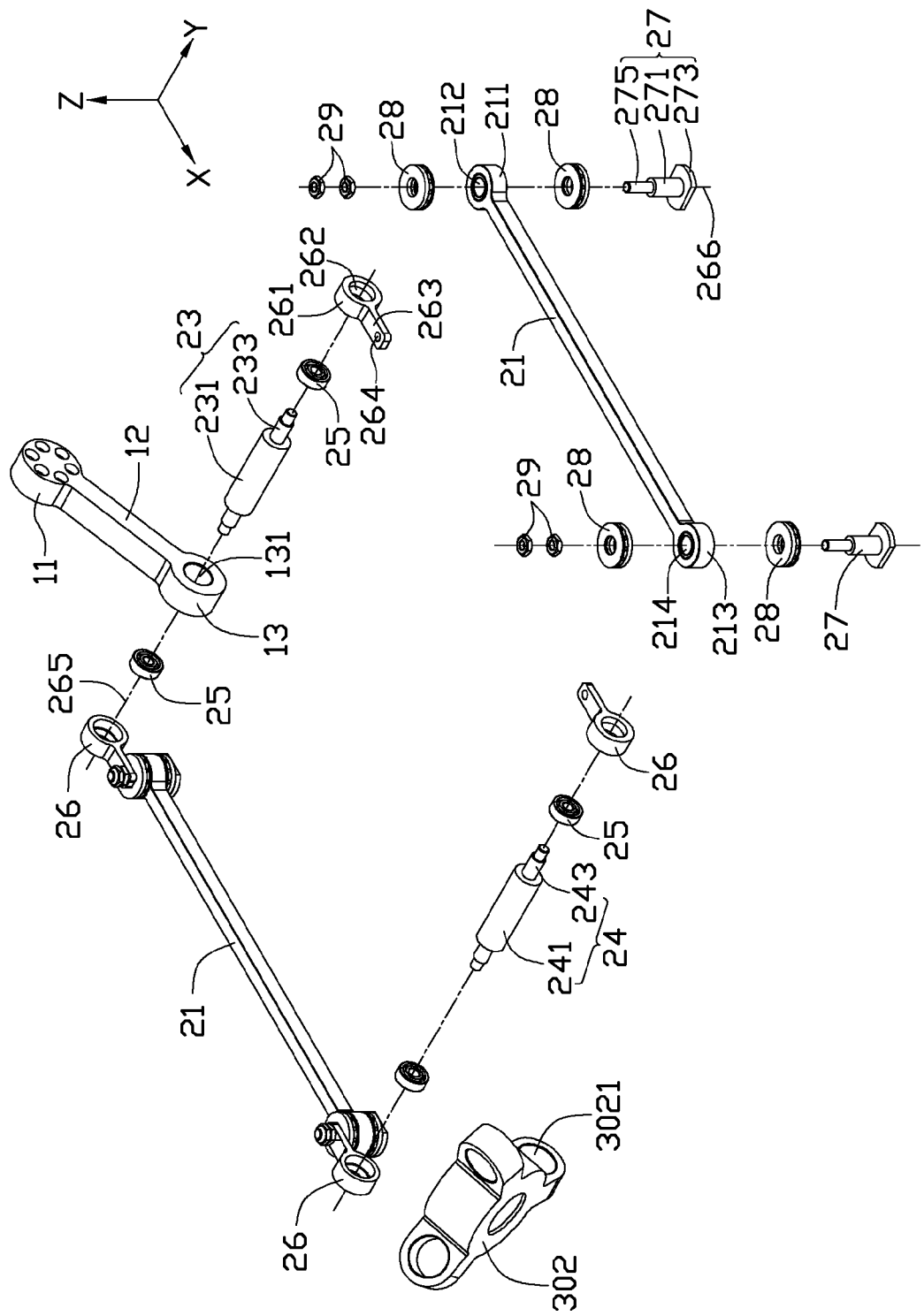
FIG. 3 is an exploded view of the translational branch joint of FIG. 2.
Figure 4:
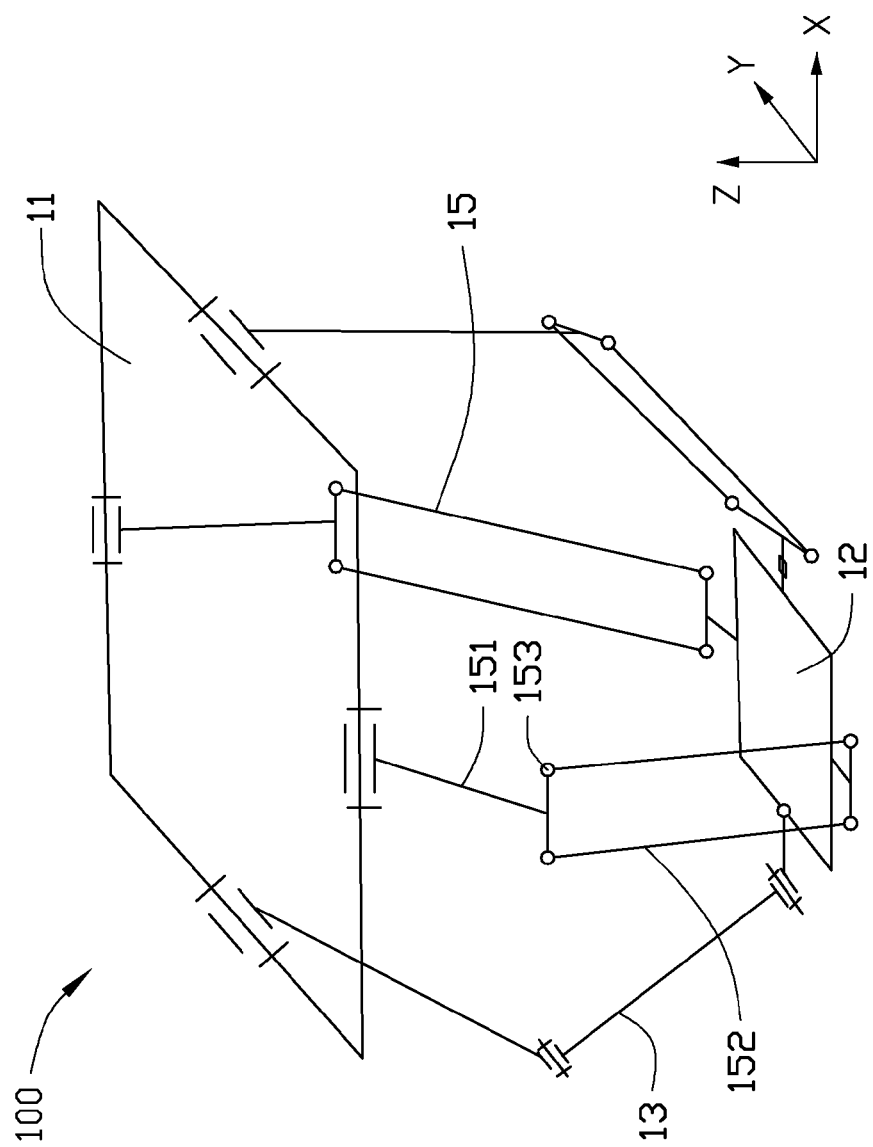
FIG. 4 is a schematic view of a commonly used parallel robot with three translational branch joints.

Referring also to FIGS. 2 and 3, each translational branch joint 200 includes a swing arm 10 and a four-bar linkage 20 connecting with the swing arm 10. Each four-bar linkage 20 includes two parallel connecting bars 21, a first link member 23, a second link member 24, and four joint members 26. The first link member 23 and the second link member 24 respectively connect the connecting bars 21 via the joint members 26. The first link member 23 is fixed to the swing arm 10. The second link member 24 is rotatably connected to the moving platform 302.

The swing arm 10 includes a connecting portion 11, a main portion 12, and an engaging portion 13. The connecting portion 11 and the engaging portion 13 extend from opposite ends of the main portion 12. The connecting portion 11 is connected to one corresponding driving device 304. The engaging portion 13 is substantially cylindrical, and defines a circular assembly hole 131.

Each connecting bar 21 includes a first end 211 and a second end 213. The first end 211 and the second end 213 are substantially cylindrical. The first end 211 defines a first connecting hole 212, and the second end 213 defines a second connecting hole 214.

The first link member 23 includes a cylindrical main body 231, and two shaft portions 233 extending from opposite ends of the main body 231. The main body 231 is configured for extending through the assembly hole 131 of the swing arm 10.

The second link member 24 includes a cylindrical main body 241, and two shaft portions 243 extending from opposite sides of the main body 241. The main body 241 is configured for extending through an engaging hole 3021 of the moving platform 302.

Each joint member 26 includes an annular first joint portion 261, and a second joint portion 263 extending from the first joint portion 261. The first joint portion 261 defines a first pivot hole 262 for rotatably receiving the shaft portion 233 of the first link member 23. The joint member 26 and the first link member 23 are aligned along a first axis 265 parallel to the Y-axis as shown in FIG. 3. The second joint portion 263 defines a second pivot hole 264. The joint member 26 and the second link member 24 are aligned along a second axis 266 parallel to the Z-axis as shown in FIG. 3. The first axis 265 is substantially perpendicular to the second axis 266, and not aligned in a same plane.

Each four-bar linkage 20 further includes four first bearings 25, four pivot shafts 27, four second bearings 28, and a plurality of fasteners 29. The first bearings 25 are received in the first pivot holes 262 of the first joint portions 261, thus rotatably connecting the first link member 23 to the connecting bars 21. Each pivot shaft 27 extends parallel to the Z-axis as shown in FIG. 3, and includes a cylindrical shaft portion 271, a resisting portion 273, and a threaded portion 275. The resisting portion 273 and the threaded portion 275 extend from opposite ends of the shaft portion 271. Each of two of the second bearings 28 are sleeved on the shaft portion 271. One of these second bearings 28 is positioned between the connecting bar 21 and the second joint portion 263, and the other of these second bearings 28 is positioned between the connecting bar 21 and the resisting portion 273. In the illustrated embodiment, the second bearings 28 are needle bearings. The fasteners 29 are threaded on the resisting portions 273 of the pivot shafts 27.

To assemble the branch joint 200, the threaded portion 275 of each pivot shaft 27 extends through one second bearing 28, the first connecting hole 212 of one connecting bar 21, another second bearing 28, and the second pivot hole 264 of the joint member 26, and receives the fasteners 29 threaded thereon. The first end 211 of each connecting bar 21 is rotatably connected to the second joint portion 263 of the joint member 26. The second end 213 of each connecting bar 21 is rotatably connected to the joint member 26 as described. The first link member 23 extends through the assembly hole 131 of the swing arm 10, with the main body 231 tightly engaging the swing arm 10. The first bearings 25 are received in the first pivot holes 262 of the first joint portions 261. The shaft portions 233 of the first link member 23 are received in the first bearings 25 respectively. The first link member 23 is rotatably connected to the first joint portions 261, and is rotatable relative to the first axis 265. The second link member 24 is also rotatably connected to the first joint portions 261 of the joint member 26 according to above-described assembly steps of the first link member 23. The translational branch joint 200 is thus assembled.

During assembly of the parallel robot 300, the swing arms 10 of three branch joints 200 are respectively connected to the three driving devices 304, and the second link members 24 respectively extend through the engaging holes 3021 of the moving platform 302. One end of the pivot shaft 303 is rotatably connected to the support 301, and the other end of the pivot shaft 303 is rotatably connected to a rotating portion 3022 (as shown in FIG. 1) of the moving platform 302.

In use, the pivot shaft 303 is rotated relative to the moving platform 302. The swing arms 10 are driven to swing by the driving devices 304, and the four-bar linkages 20 alter their parallelogram configuration thus moving the moving platform 302 along the X, Y, or Z-axis. A cutter or a fixture (not shown) can be assembled on the rotating portion 3022 of the moving platform 302.

A rotation angle of the connecting bars 21 is not restricted by the joint members 26, and can be as high as 180°. Thus, the moving platform 302 of the parallel robot 300 can move through a wide range of positions and orientations, rendering the parallel robot 300 highly flexible. In addition, the four-bar linkage 20 utilizing the joint members 26 and the pivot shafts 27 is easily manufactured, at a relatively low cost.

It should be pointed out that in alternative embodiments, the parallel robot 300 need not include the pivot shaft 303, the first bearings 25 and the second bearings 28. The pivot shaft 27 may be omitted, provided that a substitute shaft is integrally formed on the second joint portion 263. Furthermore, the connecting bars 21 may further be connected by one or more strengthening bars, in order to enhance the stability of the four-bar linkage 20. The strengthening bars rotatably connect the connecting bars 21.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A translational branch joint for a parallel robot, the translational branch joint comprising:
   a swing arm; and
   a four-bar linkage connecting with the swing arm, the four-bar linkage comprising:
      two connecting bars parallel to each other;
      a first link member and a second link member connecting the connecting bars; and
      a plurality of joint members, each joint member comprising a first joint portion and a second joint portion extending from the first joint portion along a radial direction of the first joint portion outwardly, the first joint portion defining a first pivot hole along having a first axis substantially perpendicular to the connecting bars and coaxial with a longitudinal axis of the first link member, and the second joint portion defining a second pivot hole along a second axis substantially perpendicular to the first axis and the connecting bars; and
      a plurality of pivot shafts,
   wherein the first joint portions of the joint members are sleeved on ends of the first link member and the second link member, each of the first link member and the second link member is rotatably received in the corresponding first pivot hole and is rotatable about the corresponding first axes, each pivot shaft extends through a corresponding connecting bar and the second pivot hole of a corresponding second joint portion, the second joint portions of the joint members are connected to ends of the connecting bars, and each of the connecting bars is rotatable about each of the corresponding second axes.

2. The translational branch joint of claim 1, wherein the first link member comprises a main body and two shaft portions extending from opposite ends of the main body.

3. The translational branch joint of claim 2, wherein the four-bar linkage further comprises a plurality of first bearings positioned in the first pivot holes, and connected to the shaft portions.

4. The translational branch joint of claim 1, wherein the four-bar linkage further comprises a plurality of second bearings positioned on the pivot shafts, each of the second bearings located between a corresponding connecting bar and a corresponding joint member.

5. The translational branch joint of claim 4, wherein the first bearings and the second bearings are needle bearings.

6. The translational branch joint of claim 1, wherein the four-bar linkage further comprises a plurality of fasteners threaded on the pivot shafts, respectively.

7. The translational branch joint of claim 1, wherein the four-bar linkage comprises four joint members; each connecting bar comprises a first end and a second end, the first ends connected to opposite ends of the first link member via two of the joint members, and the second ends connected to opposite ends of the second link member via the other two joint members.

8. The translational branch joint of claim 1, wherein the swing arm comprises a main portion, a connecting portion, and an engaging portion, the connecting portion and the engaging portion extending from opposite ends of the main portion and the engaging portion sleeved on the first link member.

9. A parallel robot, comprising:
   a support;
   a moving platform; and
   three translational branch joints connecting the moving platform to the support, each translational branch joint comprising:
      a swing arm; and
      a four-bar linkage connecting with the swing arm, the four-bar linkage comprising:
         two connecting bars parallel to each other;
         a first link member and a second link member connecting the connecting bars;
         wherein the four-bar linkage further comprises a plurality of joint members, each comprising a first joint portion and a second joint portion extending from the first joint portion along a radial direction of the first joint portion outwardly, the first joint portion defining a first pivot hole along a first axis substantially perpendicular to the connecting bars and coaxial with a longitudinal axis of the first link member, and the second joint portion defining a second pivot hole along a second axis substantially perpendicular to the first axis and the connecting bars; and
         a plurality of pivot shafts, wherein the first joint portions of the joint members are sleeved on ends of the first link member and the second link member, each of the first link member and the second link member is rotatably received in the corresponding first pivot hole and is rotatable about the corresponding first axes, each pivot shaft extends through a corresponding connecting bar and the second pivot hole of a corresponding second joint portion, the second joint portions of the joint members are connected to ends of the connecting bars, and each of the connecting bars is rotatable about each of the corresponding second axes.

10. The parallel robot of claim 9, further comprising a rotatable shaft connecting the moving platform to the support.

11. The parallel robot of claim 9, further comprising three driving devices positioned at a bottom of the support and configured for driving the translational branch joints.

12. The parallel robot of claim 9, wherein the first link member comprises a main body and two shaft portions extending from opposite ends of the main body.

13. The parallel robot of claim 12, wherein the four-bar linkage further comprises a plurality of first bearings positioned in the first pivot holes, and connected to the shaft portions.

14. The parallel robot of claim 9, wherein the four-bar linkage further comprises a plurality of second bearings positioned on the pivot shafts, each of the second bearings located between a corresponding connecting bar and a corresponding joint member.

15. The parallel robot of claim 14, wherein the first bearings and the second bearings are needle bearings.

16. The parallel robot of claim 9, wherein the four-bar linkage further comprises a plurality of fasteners threaded on the pivot shafts, respectively.

17. The parallel robot of claim 9, wherein the four-bar linkage comprises four joint members; each connecting bar comprises a first end and a second end, the first ends connected to opposite ends of the first link member via two of the joint members, and the second ends connected to opposite ends of the second link member via the other two joint members.

18. The parallel robot of claim 9, wherein the swing arm comprises a main portion, a connecting portion, and an engaging portion, the connecting portion and the engaging portion extending from opposite ends of the main portion and the engaging portion sleeved on the first link member.

* * * * *